United States Patent

[11] 3,627,875

[72] Inventor Christiane Fellonneau, born Drouet
 Paris, France
[21] Appl. No. 255,117
[22] Filed May 15, 1963
[45] Patented Dec. 14, 1971
[73] Assignee Industrial Nuclear Investigation Company
 Limited
 Vaduz, Liechtenstein
[32] Priority June 12, 1962
[33] Switzerland
[31] 6993/62

[54] ANTIPYRETIC AND INFLAMMATION COMBATTING COMPOSITIONS
3 Claims, 1 Drawing Fig.

[52] U.S. Cl. .................................................. 424/94,
 424/230
[51] Int. Cl. .................................................. A61k 27/00
[50] Field of Search ........................................ 167/73, 65
 C; 424/94, 230

[56] References Cited
UNITED STATES PATENTS

| | | | |
|---|---|---|---|
| 3,004,893 | 10/1961 | Martin ........................ | 424/94 |
| 3,072,532 | 1/1963 | Innerfield .................... | 424/94 |
| 1,746,984 | 2/1930 | Bausch ........................ | 424/234 |
| 2,040,848 | 5/1936 | Hirschhorn .................. | 424/358 |

OTHER REFERENCES

Beiler et al., J. Pharm. & Exptl. Therapy, 118(4), pp. 415–419, 12–56.
Merck Index, 7th Ed. (1960) pp. 12–13.
U.S. Dispensatory (1), 25th Ed. (1955) pp. 15–19.
U.S. Dispensatory (2), Vol. 2 (1960) pg. 48
Lesser, Drug & Cosmetic Ind. 71(2) pp. 178–179, 250–254, 8–52.
Martin et al., Am. J. Pharm., 194–197 (6–57).
Innerfield et al., J. Am. Med. Assn. 152(7), pp. 597–605, 6–13–53.

*Primary Examiner*—Stanley J. Friedman
*Attorney*—Waters, Roditi, Schwartz & Nissen

ABSTRACT: Compositions having antipyretic and inflammation-reducing activity which employ enzymes.

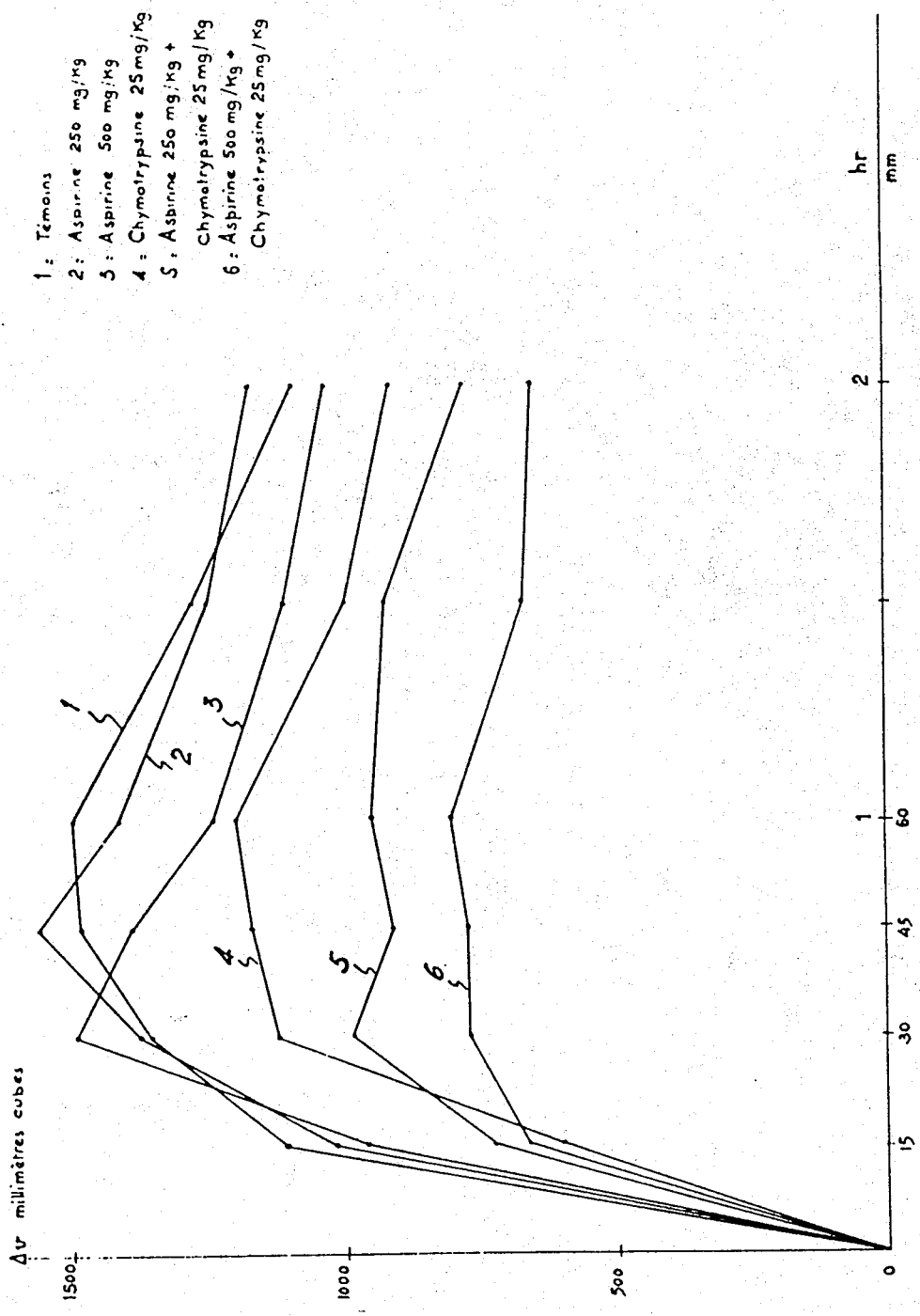

ANTIPYRETIC AND INFLAMMATION COMBATTING COMPOSITIONS

The object of the present invention is a process for obtaining new medicinal compositions which are exceptionally good antipyretics, i.e. temperature depressants and reducers of inflammation; and relates also to the compositions obtained thereby. The compositions are essentially formed by the combination of a salicylic derivative, viz salicylic acid, its salts or its esters, and in particular of acetyl- salicylic acid and its salts, with at least one enzyme having a hydrolizing and/or depolymerizing action.

Throughout the following description, in reference to acetylsalicylic acid, it will be referred to by its usual commercial name of aspirin but it is understood that in all cases the other derivatives of salicylic acid, and in particular the aluminum and magnesium salts of aspirin, would play the same part.

The following are examples of enzymes having a hydrolizing and/or depolymerizing action: trypsin, chymotrypsin, the pancreatic enzymes, fungic culture enzymes, e.g. those extracted from Aspergillus Orizae, the bacterial enzymes extracted from bacteria cultures, papain, bromellin, ficin, the fungic amylases or the amylases extracted from malt, and the other enzymes of animal or vegetable origin whose activity is proteolytic, esterasic, amylolytic, fibrinolytic, and/or depolymerizing, but for the purposes of the description reference will hereinafter principally be made to alpha-chymotrypsin, it being understood that the behavior of the other enzymes referred to above is comparable for the purposes of the invention.

It has already been possible to show that the aforementioned enzymes have an action on the permeability of organic tissues, for preventing the formation of oedemae, and they also combat inflammation to a certain extent; however, the action of salicylic acid and of its derivatives, and in particular of aspirin, is in practice difficult to trace in the experimental animal, even in massive doses.

The startling discovery has been made that compositions prepared in accordance with the invention have an antiinflammatory activity of the order of double that exerted by their enzyme content, if these enzymes be administered along.

These two discoveries, which make compositions obtained in accordance with the invention excellent agents for combating influenza and inflammatory illnesses of the rheumatoid type, have been confirmable quantitatively on laboratory test animals after they have been discovered in human treatment. The potentializing synergy of the antiinflammation activity could be determined quantitatively by the classic DOMEN-SOZ method (Act. Pharm. 1954, 7, 73), consisting of injecting under the plantary aponeurosis of a rat, 0.1 cc. of a 6 percent solution of dextran sulfate. The injection was made in a limb of the male Wistar rat, weighing between 130 and 160 g. Ten animals were used per batch. There was a rapid swelling of the limb, whose size was evaluated by the variation in volume, delta V, expressed in cubic millimeters (or thousandths of a milliliter). The measurement of the volume of the paw were made by means of the Phevillard and Gino plethysmoscope.

In practice, the measurement of the volume of the paw was made before the administration of dextran. Once the inflammatory substance had been injected, six volume measurements were made, 15, 30, 45, 60, 90 and 120 minutes, after dextran. When testing an antiinflammation substance, the latter is administered half an hour before the dextran.

The results were expressed by integrating the surface defined by the inflammation curve, the inhibition being expressed as a percentage of the test value. The use of 10 animals per batch made it possible to calculate the standard deviation from the norm and to arrive at results with a known coefficient of certainty.

It is shown in literature (op. cit.) that the threshold active subcutaneous dose of acetylsalicylic acid is 500 mg. per kg. on this type of oedema. The activity of a similar oral dose is determined since this means of introduction represents the means of possible therapeutic utilization.

It has thus been possible to establish the curves shown in the accompanying drawings, which illustrate certain values as time functions, and in which curve 1 shows test values of delta V, curve 2 shows delta V for rats receiving aspirin only (oral doses of 250 mg./kg.): administered suspended in pharmaceutic alginate, curve 3 shows delta V for rats receiving aspirin only (oral doses of 500 mg./kg.), curve 4 shows delta V for rats receiving alphachymotrypsin only (25 mg./kg.). Oral administration of protected (glutinized) granules half an hour, before dextran.

It is determined that the threshold of antiinflammation activity of the enzymes administered orally appears for an oral dose of 25 mg./kg. The results thus obtained are evidence of an inhibition of 15 to 18 percent of the oedema generalized by dextran and of 20 to 23 percent of the local oedema. The inhibitions thus obtained correspond to those noted in the case of peritoneal doses of chymotrypsin at 10 mg./kg. Finally, curves 5 and 6 show the results of administration of the chymotrypsin-aspirin combination (oral),

| | | |
|---|---|---|
| curve 5 relating to | Aspirin 250 mg./kg. Chymotrypsin 25 | mg./kg. (dose |
| | Corresponding to | 10 mg./kg. |
| | of chymotrypsin | administered |
| | peritoneally, and | |
| curve 6 relating to | Aspirin 500 mg./kg. Alpha-chymotry- | |
| | | psin 25 mg./kg. |

The conclusions may be summed up in the following table which shows the antiinflammation effects obtained:

| Substance | Does mg./kg. | % of inhibition |
|---|---|---|
| Aspirin | 250 | 0 |
| Aspirin | 500 | 8.8 |
| Chymotrypsin | 25 | 21.5 |
| Aspirin-chymotrypsin | 250/25 | 31.8 |
| Aspirin-chymotrypsin | 500/25 | 45.1 |

It will thus be seen that the combination of a dose of chymotrypsin, giving rise per se to a protection of only 21.5 percent, with an inactive (per se) dose of aspirin gives a protection of 31.8 percent.

The combination of the same dose of chymotrypsin with a quantity of 500 mg./kg. of aspirin gives a protection of 45.1 percent.

An additive synergy which is moreover in itself considerable and unexpected, would only have given, in the case of this combination, inhibitions of 21.5 (instead of 31.8) and 30.3 (instead of 45.1). Hence there occurs an actual potentializing synergy, since it appears on the use of an inactive dose of aspirin (250 mg./kg.) and it significantly increases the effect of an effective dose (500 mg./kg.).

The experimental proof of a similar potentialization has been made using other enzymes, of which a certain number of examples are enumerated below with the doses utilized:

| | |
|---|---|
| Malt diastase (amylase) | 250 mg./kg. |
| Enzymes extracted from Aspergillus or Orizae cultures (purefied Takadiastase) | 50 & 100 mg./kg. |
| Pure crystallized trypsin at 24 Anson units per gram | 20 & 50 mg./kg. |
| Enzymatic complex of pancreatic origin (proteases, esterases, amylase and lipases of the pig pancreas) titrating 2,000,000 Fuld Gross units per gram | 150 mg./kg. |
| Crystallized alpha-chymotrypsin | 25 mg./kg. |
| Pure papain | 200 mg./kg. |
| Bromellin titrating 300,000 Rorer units per gram | 100 & 250 mg./kg. |
| Raw ficin | 300 mg./kg. |

Also, a series of clinical observations has made it possible to establish in the case of several dozen patients that the administration of compositions obtained in accordance with the invention yields defervescences of the order of 2.8° to 3.5° C. in a remarkably short period (1 hour to 2 hours), while the administration of corresponding doses of aspirin alone to the same patients led only to a defervescence of 2.0° to 2.4° C. in a considerably longer time period, of the order of 3 to 6 hours. Moreover, the action of the composition obtained in accordance with the invention was more lasting, of the order of 6 to 10 hours on the average, than that of aspirin, which is only of the order of 2 to 4 hours.

Hence, it was on the whole on the general symptoms of influenza (temperature, headaches, astheniae, aches, and similar signs) that the most noteworthy effects could be clinically observed: for instance, out of 60 observations, the action was highly remarkable or evident in 47 cases, the other cases being difficult to interpret by reason of infectious complications of the initial influenza. Similarly, the action of the general symptoms has been evaluated as "very favorable" in 49 cases.

These observations of the influenza syndromes were extended to other patients, to infections of the upper air passages, in which the combination of aspirin with enzyme prepared in accordance with the invention not only has antipyretic and analgesic action greater than that of aspirin, but also, thanks to its increased inflammation-combatting action, reduced the evolution period of the illness and limited the extent of the local inflammatory symptoms in the rhinopharynx and the air passages of the bronchial system. In over 82 percent of the cases, an improvement was obtained with surprising speed (defervescence, feeling better, and reduction of the local symptoms).

Finally, in the treatment of inflammatory rheumatisms, the aspirin-enzyme combination, due to the potentializing synergy of the antiinflammation effects of its components, made it possible either to reduce the daily doses of aspirin during the initial treatment and also during the maintained treatment, or to achieve a favorable therapeutic result in numerous cases resisting treatment by aspirin and even by an aspirin-chlorocin combination. In numerous cases of chronic evolutionary polyarthrites with a notable inflammatory syndrome, a better biological response has been obtained during renewed outbreaks in the same patient (speed of sedimentation and haptoglobin rating, for example) by a treatment with 3 g. of aspirin per day, combined with the enzymes, than with 4 to 4.5 g. per day of aspirin alone during a preceding treatment.

In many cases, a more rapid improvement of the speed of sedimentation was noted, passing from 35 to 40 in the first hour to 10 to 15 after 8 to 10 days of aspirin combined with the enzymes, whereas this result was generally achieved only after 12 to 14 days with aspirin alone, administered in stronger doses in similar cases.

Similarly, in maintained doses on several biologically controlled patients (viz under biological control of their inflammatory conditions so as to follow the evolution of the illness and the effect of the treatment), it was possible to reduce the doses to 1 to 1.5 g. per day of aspirin combined with the enzymes, instead of 2 to 2.5 g. generally used.

Similarly, in clinical practice, the following enzymes have been used, in combination with aspirin and its aluminum and magnesium salts, in doses of 1.5 to 3.5 g. per day, to confirm and extend the preceding observations. With each enzyme is the numerical value of its dose per 24 hours.

| | | |
|---|---|---|
| Bromellin: | 500 to 1,500 mg., Rorer units | i.e. 150,000 to 450,000 |
| Papain: | 500 to 2,000 mg./kg. | |
| Alpha-chymotrypsin: | 200 mg./kg. | |

Enzymatic fungic complex having a cellulasic, amylasic and proteasic activity, titrating at 6 Anson units per gram (proteases) and capable of hydrolizing 400 times its weight of starch in maltose (amylases) in 30 minutes: 1,000 mg.

It will be seen that the doses of enzymes have been evaluated in proteolytic units, for want of a direct means of evaluating the antiinflammation activity. This is only one convenient means of biochemical measurement, having no obligatory relation to the antiinflammation activity intervening in the present invention, and for which there are, at present, no specific units, but it will be appreciated that it is units of this kind which would normally be used.

The compositions according to the invention are made up of combinations in powder, pill, capsule or similar form, in such a way that at least the enzymatic portion of the composition, or the whole of the said composition, is contained within a powder, an enclosure or a mass protected from the attacks of the gastric juices, so that it can act only in the intestinal region. This protection may be made, e.g. by coating the grains, powders or pills with gluten or with resins or natural or synthetic lacquers, or alternatively by the use of indigestible capsule, which thus only liberate their content in the intestinal region.

I claim:

1. Process for the production of analgesia in a host afflicted with pain which comprises the oral administration of approximately equal parts by weight of aspirin and papain.

2. A therapeutic antipyretic and inflammation reducing composition consisting of a combination of 1.3 to 3.5 grams of aspirin, the magnesium salt of aspirin or the aluminum salt of aspirin, together with 0.6 to 6 Anson units of alpha-chymotrypsin, chymotrypsin, trypsin or papain.

3. A composition as claimed in claim 2, comprising a protective coating on at least the enzyme to permit he same to act only after reaching the intestinal region.

* * * * *